Figure 2:
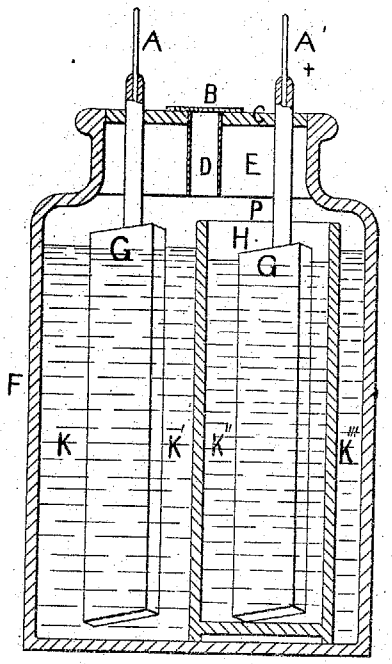

2 Sheets--Sheet 1.

G. L. LECLANCHE.

Galvanic-Batteries, and in Combining therewith Secondary or Accumulating Batteries.

No. 5,768. Reissued Feb. 17, 1874.

WITNESSES.

J. Barry Coleman

Wm. E. Chaffee

George L. Leclanche

By Boyd Elliot

Atty. for the

INVENTOR.

2 Sheets--Sheet 2.
G. L. LECLANCHE.
Galvanic-Batteries, and in Combining therewith Secondary or Accumulating Batteries.
No. 5,768. Reissued Feb. 17, 1874.
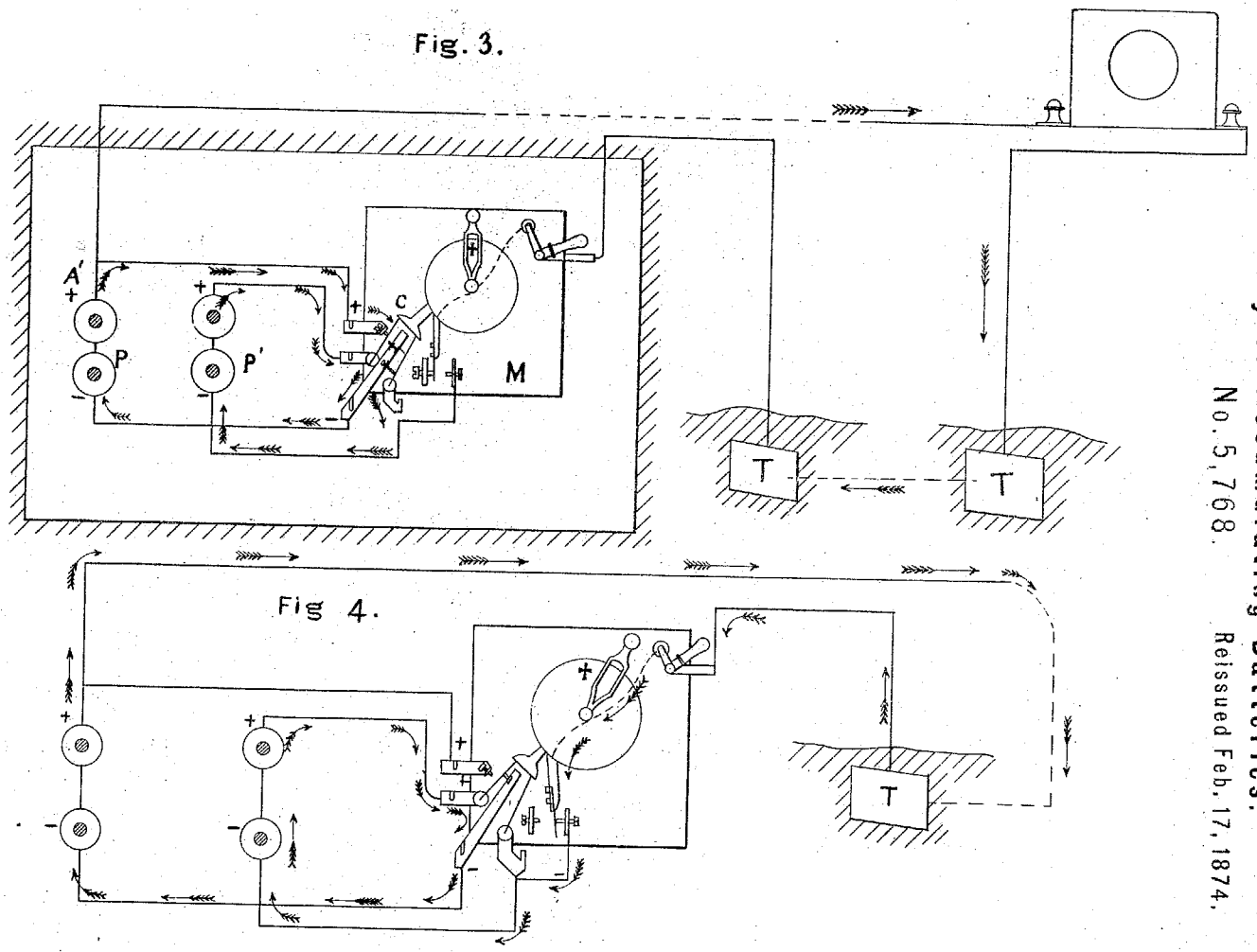
WITNESSES.
Harry Coleman.
Wm. B. Chaffee.
Gregory L. Leclanche
By Boyd & Eliot
Atty. for Pt.
INVENTOR.

UNITED STATES PATENT OFFICE.

GEORGES L. LECLANCHÉ, OF PARIS, FRANCE, ASSIGNOR TO HILBORNE L. ROOSEVELT, OF NEW YORK CITY.

IMPROVEMENT IN GALVANIC BATTERIES AND IN COMBINING THEREWITH SECONDARY OR ACCUMULATING BATTERIES.

Specification forming part of Letters Patent No. 64,113, dated April 23, 1867; Reissue No. 5,768, dated February 17, 1874; application filed January 27, 1874.

DIVISION A.

*To all whom it may concern:*

Be it known that I, GEORGES LIONEL LECLANCHÉ, of the city of Paris, in the Republic of France, have invented certain Improvements in Electrical Apparatus, of which the following is a specification:

In piles or batteries where sulphates of mercury, copper, and even lead are made use of, the metallic salts destined to depolarize the positive plate are always more or less soluble, and this solubility is a permanent cause of wear to the negative metal, and necessitates continual addition.

In my new apparatus I have had in view the following results: First, absolute insolubility of the depolarizing substance, which condition is so essential that without it any or every element of pile or battery must sooner or later become unserviceable, whether at work or at rest; secondly, a considerable reduction in the number of cells necessary for working any given electro-motor.

My invention will be described as embodied, first, with an electrical generator, and, secondly, with an electrical accumulator.

For the generator, I take a flask with a large neck, into which I introduce a porous vase for receiving a plate of carbon or graphite, such as is obtained from the lining of gas-retorts, to which I attach a metallic wire, acting as the positive pole, and I fill this vase with peroxide of manganese reduced to powder, more or less coarse, or preferably with a mixture of peroxide of manganese and powdered graphite. I then fill up the flask with sand, sawdust, or, in a word, any granulated substance which will thicken the water, and I place in the same a disk or plate of zinc provided with a metallic wire, acting as the negative pole. The entire mass of sand and peroxide of maganese is then moistened with a concentrated solution of chlorohydrate of ammonia. The conducting-wires are passed through holes made in the cork or bung which closes the neck of the flask, and in the center of the said cork a third hole is made, into which a small glass tube may be inserted. When the flask is thus closed and free from leakage it may be sealed in the usual manner. When the sealing-wax is completely hardened, I cut off the glass tube level with the flask, and cover the hole with a small sheet of india-rubber stuck to the wax. When a flask is thus closed, a clean cut may be made in the rubber sheet just over the tube, which cut serves as a valve that allows the escape of gases, if necessary, while it intercepts the flow of the liquid, even though the flask be overturned. In this manner a pile or battery can be transported from place to place without any of the liquid therein contained escaping. What may be termed an electrical generator is thus composed of one or more elements of piles, according to the electrical power acquired. It is, however, evident that the pile would work equally well if it were not closed, but left open, in the ordinary manner of constructing batteries.

The polarization apparatus or electrical accumulator of which I make use is composed of two flasks, in which are placed two plates of graphite, or two plates of unoxidizable metal. These two plates are buried in powdered graphite (a good conductor of electricity) and moistened with a liquid which is also a good conductor, such as potash-water, for instance.

In order to obtain energetic effects, as well as for the convenience of construction, it is well to separate the poles—that is to say, the two plates of graphite and the powdered graphite—by means of a diaphragm of a porous nature. From such a construction of a galvanic pile, the following result is obtained: If the current of the pile be caused to pass during a certain length of time through the accumulator, and then the pile be disconnected by uniting the two graphites, a current is obtained which acts in the opposite direction of the pile first used. This property arises from the well-known physical fact that, where the current of any pile is passed for a certain length of time through an electrolyte by means of two platina plates or wires, these two bodies, which have served to transmit the current, have acquired a particular property, which can be rendered perceptible by placing a galvanometer in the stead of the pile. An electrical current is thus obtained which is always opposed to that of the pile made use of. This fact is expressed by stating that the plates or bodies are polarized, which signifies that the seat of the electrical forces is on the plates. This property, which has been recorded some years back, has not received much attention, and it has not been supposed that a strong electrical current could be thus obtained susceptible of many applications; but, as I have above stated, as the current which the accumulator is capable of furnishing is in opposition to that of the pile, in order to make use of all the actions of the current in the applications desired, it is deemed neccesary to make use of a self-acting commutator.

To give a clear idea of these applications, the accompanying drawings are furnished to show their relation to a transmitting telegraphic apparatus, and with such an apparatus I diminish, to a considerable extent, the number of piles necessary for transmitting dispatches.

Figure 1:
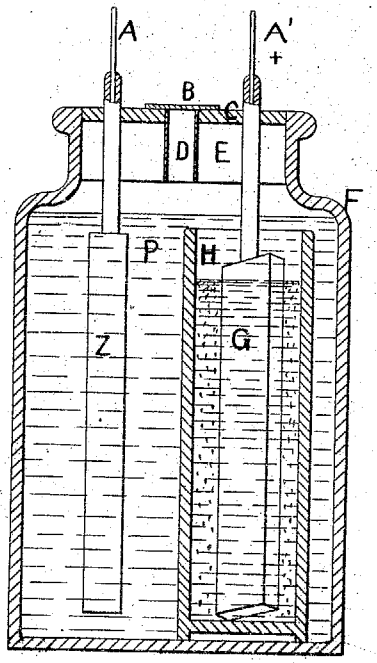

Figure 1 represents the electrical generator, in which A is the zinc or negative pole; A′, the graphite or positive pole; B, the little india-rubber valve; C, the wax; D, the glass tube; E, the cork; F, the flask; G, the graphite plate; H, the porous vase, containing a mixture of peroxide of manganese and chlorohydrate of ammonia; Z, the zinc disk; and P, the liquid, containing a solution of chlorohydrate of ammonia, which, in case it is desired to transport the pile, is charged with sawdust or sand, or other equivalent substance, for giving it density.

Fig. 2 represents the accumulator, in which A and A′ are the two poles; G and G′, the two plates of graphite; K K′ K″ K‴, powdered charcoal moistened with a good conducting liquid, such as potash-water. F is the flask; H, the porous vase; D, the glass tube; E, the cork; B, the valve, and C the wax for sealing the flask.

Fig. 3 represents the system complete, with the pile polarizing the accumulator, in which case the apparatus is said to be "in quantity."

Fig. 4 represents the position of the system when it is utilizing the current of polarization. The apparatus is then said to be "in tension." M is the manipulator; P, the pile or generator; P′, the accumulator or polarizer; C, the commutator, which it is not necessary to describe in detail, as that can be varied according to circumstances. The elements of the piles can either be arranged in tension or in quantity, and in such cases the two poles terminating the batteries are placed in communication with the two wires which constitute the two poles of the electrical accumulator.

An apparatus is thus obtained which can be applied to every kind of telegraphic system, and generally to all kinds of electrical motors.

My invention, therefore, may be said to consist in the use, in electrical piles, of peroxide of manganese moistened with a liquid containing a salt in solution which has no chemical action on the peroxide of manganese. The salt which has given me the best results is chlorohydrate of ammonia, but all salts with an ammoniacal base will also give good results. Said invention also consists in the use of polarizing apparatus which can be applied to every description of pile.

Experience has shown me that all such salts give excellent results, because, when the battery is in operation, ammonium is formed at the positive pole, which is more combustible in the presence of peroxide of manganese than free hydrogen.

I therefore claim—

1. The combination, with the other necessary elements of a galvanic battery, of peroxide of manganese, substantially as described, and for the purposes set forth.

2. The combination, in or with the porous cells of a galvanic battery, of an anode and salts or salts to be decomposed, substantially as described, and for the purposes set forth.

3. The combination, with the anode in a porous cell, of the decomposing and to be decomposed salts packed therein in a dry state, substantially as described, and for the purposes set forth.

4. The combination, with the anode in a porous cell of salts highly insoluble, and salts for decomposing the same by electrolytical action, substantially as described, and for the purposes set forth.

5. The graphite plates, the flask, and the porous vase, all in combination, substantially as described, and for the purpose set forth.

6. A polarizing apparatus in combination with a battery, as hereinbefore described, and for the purposes set forth.

7. The combination, in general, in a galvanic battery, of the ammoniacal salts with the peroxide of manganese, substantially as set forth.

GEORGES L. LECLANCHÉ.

Witnesses:

GEORGE MERRILL,
JOHN MEREDITH READ, Jr.